D. B. MICHIE.
TOWEL HOLDER.
APPLICATION FILED MAR. 11, 1911.

1,086,200.

Patented Feb. 3, 1914.

WITNESSES:

INVENTOR
David B. Michie
BY Munn & Co.
ATTORNEYS

UNITED STATES PATENT OFFICE.

DAVID B. MICHIE, OF CHICAGO, ILLINOIS.

TOWEL-HOLDER.

1,086,200.  Specification of Letters Patent.  Patented Feb. 3, 1914.

Application filed March 11, 1911. Serial No. 613,717.

*To all whom it may concern:*

Be it known that I, DAVID B. MICHIE, a citizen of the United States, and a resident of Chicago, in the county of Cook and State of Illinois, have invented a new and Improved Towel-Holder, of which the following is a full, clear, and exact description.

My device relates generally to devices for holding towels and more particularly it involves an article of simple construction and pleasing appearance which will effectively perform the function for which it was designed.

The object of my invention is to provide a holder for towels which may also serve the purposes of a handle for drawers, which shall be of simple construction and capable of production at a low cost; the relation of the various parts being such that it will effectively hold the towel in position for use.

Reference is to be had to the accompanying drawings forming a part of this specification, in which like characters of reference denote corresponding parts in all the views, and in which—

Figure 2:
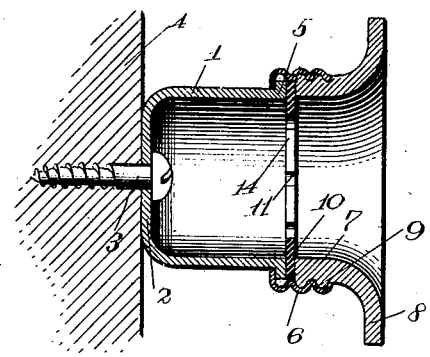
Figure 1:
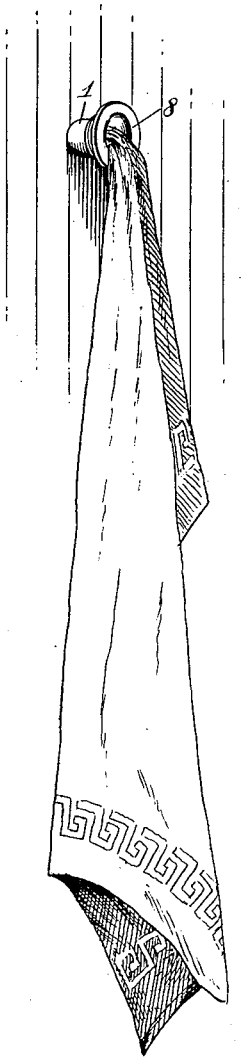
Figure 3:
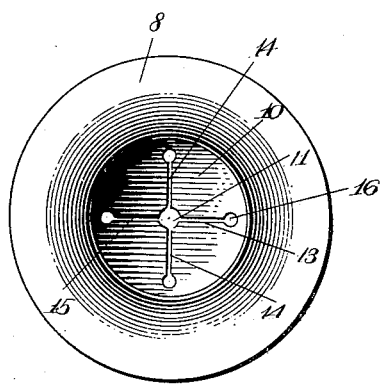

Figure 1 is a perspective view of my device in use; Fig. 2 is a vertical sectional view thereof; Fig. 3 is a front view.

The holder comprises a cylindrical body member 1 having a closed end 2 provided with a central aperture through which suitable fastening means, as a screw 3, is adapted for engagement with a support 4. The outer end of the member 1 is provided with a shoulder 5 against which one end of the corrugated or threaded member 6 engages. A second body member 7 having the outer end thereof flared, as at 8, is provided with suitable threads 9 for engagement with the corrugated member 6 whereby engagement of the members 1 and 7 is effected. Between the outer end of the body member 1 and the inner end of the second body member 7, a gasket 10, having the same peripheral outline as the open end of the member 1, is securely positioned. This gasket may be preferably made of rubber, although any other resilient substance will do, the central portion of the gasket being provided with an opening 11 having the radially extending slots 12, 13, 14 and 15 extending therefrom; the outer end of each of these slots is preferably enlarged by providing the gasket with openings 16.

My device is placed in position for use by removing the outer body member 7 and the gasket 10 and placing the body member 1 in position with a support 4, as shown in Fig. 2. The second body member 7 is then placed in normal position after the gasket 10 has been inserted in the device; the towel is placed in position thereon by forcing one corner portion thereof into the central open portion of the gasket, which, by reason of its resiliency and by reason of the slots 13, 15, will tightly grip the corner portion of the towel, whereby it will be securely held in position, as shown in Fig. 1. The towel may be removed by merely pulling it out, the resilient construction of the gasket permitting this.

My device is particularly adapted for serving the purpose of a handle on drawers, in addition to performing the functions of a towel holder, and may be conveniently used in such position. The holder, on the surface of its flared outer end 8, offers suitable space for placing a person's name, whereby when a number of towels are used in one place, each person will know the location of his own.

My device is capable of many modifications in size and shape and may be made either large or small, without departing from the spirit of the invention as defined in the appended claim.

Having thus described my invention, I claim as new, and desire to secure by Letters Patent:

A device of the character described, comprising a cylindrical member having one end closed and provided with an opening therein for a fastening screw, the open end of the member being provided with an external shoulder, a second cylindrical member open at both ends and having its outer end flared, the inner end of the member being externally threaded, a threaded sleeve on the threaded portion of the second member and having an inwardly extending flange engaging the shoulder of the first member, and a disk of resilient material between the said members and having a central opening and slots radiating from said opening.

In testimony whereof I have signed my name to this specification in the presence of two subscribing witnesses.

DAVID B. MICHIE.

Witnesses:
WALTER G. BAUCH,
JOHN W. CASEY.